June 28, 1932.                K. SLIDELL                1,864,770
              METHOD OF PRODUCING CELLULAR MATERIAL
                      Filed July 3, 1930

Witness:
William P. Kilroy

Inventor:
Kemper Slidell
By Samuel W. Banning
        Atty

Patented June 28, 1932

1,864,770

UNITED STATES PATENT OFFICE

KEMPER SLIDELL, OF MADISON, WISCONSIN, ASSIGNOR, BY MESNE ASSIGNMENTS, TO AMERICAN FACE BRICK RESEARCH CORPORATION, A CORPORATION OF ILLINOIS

METHOD OF PRODUCING CELLULAR MATERIAL

Application filed July 3, 1930. Serial No. 465,536.

This invention relates to method of producing cellular material.

In attempting to bloat argillaceous or similar earthy material under heat in the production of a cellular product, difficulty has been experienced on account of the tendency of the material while in the fused or plastic condition to firmly adhere to the surfaces with which it comes in contact, and this is particularly true where it is attempted to bloat such material in molds in the production of building blocks, units or columns of predetermined size.

By reason of the high degree of temperature required in order to secure the bloating of such materials, and by reason of the fact that while bloating the material is necessarily in a semi-fluid or plastic condition, it becomes necessary to provide some form of coating or covering for the walls of the mold or other surfaces exposed to the material, which for convenience in the present description may be referred to as lubricating material, by which term is meant some material which will not fuse at the bloating temperature and which will part within itself in order to permit the extraction or removal of the bloated mass from the mold or other surface with which it has been in contact during the bloating operation.

For this lubricating purpose, sand or the like constitutes a suitable medium where the bloating occurs in the form of a slab or layer upon a flat horizontal surface which will retain a layer of sand, but where molds are employed, difficulty is experienced in securing adhesion of sand or the like to vertical or sloping surfaces. Nor is it entirely satisfactory to employ rigid plates or slabs of baked core material for a mold facing, since the intense heat developed during the bloating operation tends to destroy the binder employed in the baking of such cores, with a consequent crumbling or disintegration of the material.

The present invention relates to a method employed for overcoming these difficulties, by the employment of a lubricating material so disposed around the exposed surfaces of the mold and in relation to the charge of granular earthy material to be bloated, that as the bloating occurs it will tend to elevate the lubricating material with it and maintain an interposed layer of such lubricating material between the walls of the mold and the bloating material within, so that adherence will be avoided.

Various materials may be employed as lubricants for this purpose, but excellent results have been secured by the use of exfoliated zonolite, which is a material of flaky consistency which renders it peculiarly adaptable to the requirements of the present invention. Other materials which may be employed in addition to sand and exfoliated zonolite are powdered graphite and zonolite as mined when sifted through a twenty mesh screen, although it will be understood that it is not the intention to limit the present invention to the use of the lubricating materials specifically named, since other materials having similar properties may be employed.

In order to more fully point out the details of the present invention, reference may be had to the accompanying drawing, wherein,—

Figure 3:
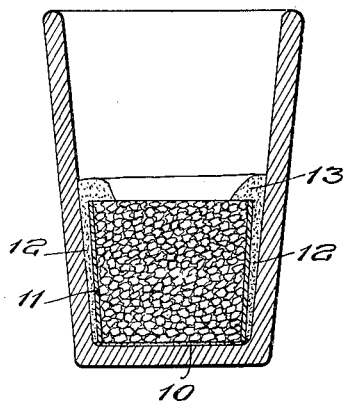
Fig. 3 is a sectional elevation of a mold of crucible formation showing the materials arranged in preparation for the bloating operation.
Figure 4:
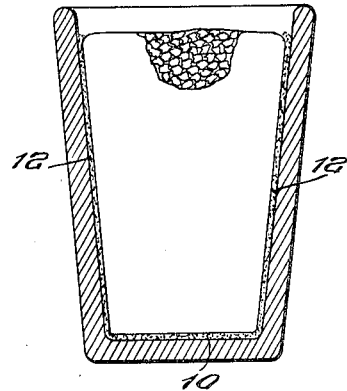
Fig. 4 is a similar view showing the disposition of the materials after the bloating operation.

In preparation for the bloating, the base of the mold is covered with a layer 10 of lubricating material, which may be in the granular form of sand or in the flaky form of exfoliated zonolite, or in the powdered form of graphite or similar material. The base layer may rest upon the bottom of the mold, where a mold having a bottom as in Figs. 3 and 4 is employed, or it may rest upon the hearth of the furnace, or other support upon which a mold of tubular form is supported.

After the base layer has been strewn upon the floor of the mold, and in order to position a layer of lubricating material along the sides of the mold, a tubular form 11, of slightly less diameter than the interior diameter of the mold, is set in position to afford an annular channel between it and the surrounding wall of the mold, and this channel is filled with a thin ring of lubricating material 12. Thereafter, the granular particles of earthy material to be bloated are filled into the center of the mold within the ring shaped form until the form is filled to the top. The form may then be removed, if desired, or if made of combustible material such as cardboard or the like, it may be allowed to remain and be consumed in the bloating operation.

Additional lubricating material is filled in, in the form of an overlapping ring 13, which extends inwardly above the upper surface of the granular earthy material, and with the materials thus disposed, the charge is ready to be subjected to the bloating operation. The bloating takes place in a heat zone in which the temperature is elevated sufficiently to cause a fusion and coalescence of the granular particles, and in this condition the gases evolved from the interior of the mass will cause expansion and bloating and the production of the cellular product.

During the early stages of the bloating operation, the surface particles will begin to coalesce in the formation of a continuous skin or layer which entraps the gases evolved from the interior and causes the entire mass to slowly expand or bloat to a volume two or three times as great as its original volume.

Figure 2:
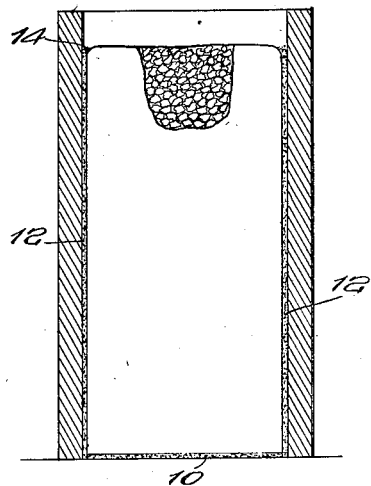
Fig. 2 is a similar view showing the disposition of the materials after the bloating has occurred.

As the bloating progresses, the lubricating material, and particularly the overlapping ring 13 thereof, will be carried upwardly and particles thereof deposited along surrounding walls of the mold, so that the bloating of the material thus tends to build up around itself a thin layer of lubricating material, and this is particularly true by reason of the fact that the surface of the bloating mass assumes a slightly rounded contour in immediate proximity to the walls of the mold, which furnishes an annular channel for the retention of the lubricating material, which is thus held and forced outwardly along the walls of the mold as the bloating progresses. In Figs. 2 and 4, the rounded marginal contour of the bloating mass is indicated by the numeral 14.

For the purposes of the present invention, it has been found that exfoliated zonolite possesses especially desirable properties, by reason of its flaky condition, which enables it to be more readily and uniformly distributed along the surfaces of the mold, without the tendency to be thrown inwardly toward the center of the mold, which might occur where sand or particles of similar fine granular material are employed as a lubricating medium.

After the bloating has progressed to the desired degree, the mold with the bloated block therein contained is removed from the bloating zone, and the mass of bloated material is either immediately removed from the mold and subjected to a protracted annealing operation, or allowed to anneal while still within the mold. In either event, the presence of the lubricating material around all portions of the mass adjacent to the walls of the mold permits removal by the parting of the lubricating medium within itself, so that adherence is prevented.

Figure 1:
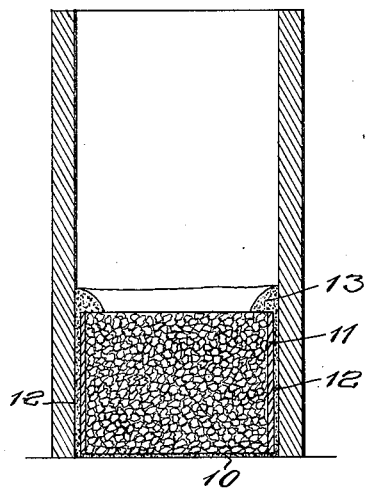
Figure 1 is a sectional elevation of a tubular mold showing a charge of granular material therein with the lubricant properly disposed in preparation for the bloating operation.

Although tubular molds of cylindrical formation may be advantageously employed, as in Figures 1 and 2, it may be found desirable in some cases to provide a slightly flaring surface, as in Figures 3 and 4, to permit easier removal of the bloated material, and although the form 11 may be truly cylindrical in order to provide a thin ring 12 of lubricating material around the charge of granular material, I may in some cases, as in Figures 3 and 4, employ a form which is not truly concentric with the walls of the mold, so that the ring 12 will be of progressively greater depth or thickness from the bottom to the top, which enables the material composing this lubricating ring to be crowded upwardly as the bloating proceeds, and thereby maintain a sufficient charge of lubricating material for vertical distribution along the side walls of the mold as the bloating progresses. The particular dimensions to be given to the ring of lubricating material will depend in some measure upon the size and shape of the mold and upon the nature of the lubricant employed, but in all cases a sufficient amount of lubricant should be provided to permit uniform distribution thereof along the walls of the mold during the bloating operation, and a formation should be given to the charge of lubricating material such that it will be carried up with the bloating of the material and distributed in the manner indicated.

Fig. 2 shows a portion of the bloated block with the surface broken away to expose the cellular formation of the interior, but it will be understood that the surface itself, unless so cut or broken, is enclosed within a continuous skin or sheath, to which in most cases a portion of the lubricating material adheres to afford a surface having somewhat the characteristics of the lubricant used. The mass of material as molded may be used as a unit for building purposes, or may be readily sawed up into blocks or sections of the desired size.

Although molds of circular cross section have been shown by way of illustration, it will be understood that square molds or molds of other desirable configuration may be employed without departing from the spirit of the invention, and that the illustrations given serve merely by way of exemplification of the principles involved in the present invention.

I claim:

1. The method of producing cellular material which consists in introducing a charge of earthy material in granular form into a mold, interposing a layer of lubricating material between the walls of the mold and the charge of granular material to prevent adhesion, and so disposing said lubricating material with reference to the charge of granular material as to insure distribution of the lubricating material along the walls of the mold during the bloating operation, subjecting the contained charge of granular earthy material to a bloating temperature to cause expansion thereof by the formation of cells throughout the mass, and to insure the distribution of the lubricating material along the walls of the mold to prevent adherence, and removing the bloated mass from the mold.

2. The method of producing cellular material which consists in introducing a charge of earthy material in granular state in a mold, interposing a layer of lubricating material between the granular charge and the surrounding walls of the mold, and positioning an additional quantity of such lubricating material around the upper margin of the charge of granular material to insure an upward distribution of said added quantity during subsequent expansion of the charge of granular material, subjecting the charge within the mold to a bloating temperature to cause expansion of the granular material by the fusion and formation of cells throughout the mass, and removing the bloated material from the mold.

3. The method of producing cellular material which consists in introducing a charge of earthy material while in granular state into a mold, confining said charge away from contact with the side walls of the mold, interposing a surrounding layer of lubricating material into the space intermediate the granular charge and the walls of the mold, subjecting the charge of granular material to a bloating temperature while within the mold to effect expansion and the formation of a cellular structure by the ebulition of gases within the mass, and an elevation and distribution of the lubricating material along the walls of the mold during the expansion of the mass, and removing the bloated material from the mold.

4. The method of producing cellular material which consists in introducing a charge of earthy material while in granular state into a mold, confining said charge away from contact with the side walls of the mold, interposing a surrounding layer of lubricating material into the space intermediate the granular charge and the walls of the mold, and distributing an additional amount of such lubricating material above the upper margin of the charge of granular material, subjecting the charge of granular material to a bloating temperature while within the mold to effect expansion and the formation of a cellular structure by the ebulition of gases within the mass, and an elevation and distribution of the lubricating material along the the walls of the mold during the expansion of the mass, and removing the bloated material from the mold.

5. The method of producing cellular material, which consists in introducing a charge of earthy material into a mold, interposing a layer of lubricating material between the walls of the mold and the charge of earthy material to prevent adhesion, and so disposing the lubricating material with reference to the charge of earthy material as to insure distribution of the lubricating material along the walls of the mold during the bloating operation, subjecting the contained charge of earthy material to a bloating temperature to cause expansion thereof by the formation of cells throughout the mass, and to insure the distribution of the lubricating material along the walls of the mold to prevent adherence, and removing the bloated mass from the mold.

6. The method of producing cellular material, which consists in introducing a charge of earthy material into a mold, interposing between the charge and the wall of the mold a layer of lubricating material adapted to adhere in part to the charge when bloated and afford the desired surface texture and to part between the charge and the contiguous wall of the mold to prevent adhesion of the charge to the wall of the mold, and subjecting the contained charge of earthy material to a bloating temperature to cause expansion thereof by the formation of cells throughout the mass and adhesion of the inner surface portions of the layer of lubricating material to afford a surface texture, and in finally removing the bloated mass from the mold.

In witness that I claim the foregoing I have hereunto subscribed my name this 27th day of June, 1930.

KEMPER SLIDELL.